(12) United States Patent
Matsushita et al.

(10) Patent No.: US 7,581,236 B2
(45) Date of Patent: Aug. 25, 2009

(54) CHUCKING METHOD OF A DISK APPARATUS AND THE DISK APPARATUS

(75) Inventors: Koujiro Matsushita, Ehime (JP); Shinichi Wada, Ehime (JP)

(73) Assignee: Panasonic Corporation, Osaka (JP)

( * ) Notice: Subject to any disclaimer, the term of this patent is extended or adjusted under 35 U.S.C. 154(b) by 115 days.

(21) Appl. No.: 10/590,216

(22) PCT Filed: Oct. 5, 2004

(86) PCT No.: PCT/JP2004/014998

§ 371 (c)(1),
(2), (4) Date: Jun. 25, 2007

(87) PCT Pub. No.: WO2005/081243

PCT Pub. Date: Sep. 1, 2005

(65) Prior Publication Data

US 2008/0052732 A1 Feb. 28, 2008

(30) Foreign Application Priority Data

Feb. 23, 2004 (JP) .............................. 2004-046181

(51) Int. Cl.
*G11B 17/028* (2006.01)
(52) U.S. Cl. .................... 720/714; 720/620; 720/689
(58) Field of Classification Search ................ 720/617, 720/619–628, 652, 653, 655, 700, 703–707, 720/711–717, 721–724, 667, 689, 691; 74/567–569
See application file for complete search history.

(56) References Cited

U.S. PATENT DOCUMENTS 6,388,974 B1 * 5/2002 Kato .......................... 720/627
2002/0067687 A1 * 6/2002 Kato .......................... 369/271

FOREIGN PATENT DOCUMENTS

JP 8-212755 8/1996
JP 2002-352498 12/2002

* cited by examiner

*Primary Examiner*—Andrea L Wellington
*Assistant Examiner*—Nathan Danielsen
(74) *Attorney, Agent, or Firm*—Dickinson Wright, PLLC

(57) ABSTRACT

A chucking method of a disk apparatus comprising a chassis outer sheath including a base body 10 and a lid 130, in which a front surface of the chassis outer sheath is formed with a disk inserting opening 11 into which a disk is directly inserted, a traverse 30 provided on the base body 10 holds a spindle motor 31A and a pickup 32, a slider mechanism 51 is disposed on one end side of the traverse 30, the slider mechanism 51 includes a cam mechanism which moves one end of the traverse 30 toward and away from the base body 10, and a slider cam mechanism 51 which moves the traverse 30 in an inserting/discharging direction of the disk, the other end of the traverse 30 is supported on the base body 10 by a fixing cam 34A, 34B, 36A, 36B, and the traverse 30 is moved by the slider cam mechanism 51 in the inserting/discharging direction of the disk and with this, the fixing cam moves the other end of the traverse 30 toward and away from the base body 10.

2 Claims, 10 Drawing Sheets

CHUCKING METHOD OF A DISK APPARATUS AND THE DISK APPARATUS

TECHNICAL FIELD

The present invention relates to a chucking apparatus suitable for a disk apparatus which records or replays into or from a disk-like recording medium such as a CD and a DVD, and more particularly, to a so-called slot-in type disk apparatus capable of directly inserting or discharging a disk from or to outside.

BACKGROUND TECHNIQUE

A loading method is widely employed in conventional disk apparatuses. In this method, a disk is placed on a tray or a turntable, and the tray or the turntable is loaded into an apparatus body.

According to such a loading method, however, since the tray or the turntable is required, there is a limit for thinning the disk apparatus body.

As a slot-in type disk apparatus, there is proposed a method which a conveying roller is abutted against a disk surface to pull the disk in (e.g., a patent document 1).

(Patent Document 1)

Japanese Patent Application Laid-open No. H7-220353

According to the slot-in type as proposed in the patent document 1, however, since a conveying roller which is longer than a diameter of the disk is used, the width of the apparatus must be increased, and the thickness of the apparatus is also increased due to this conveying roller.

Therefore, according to such a slot-in type disk apparatus, it is difficult to reduce the thickness and size of the disk apparatus body.

Hence, it is an object of the present invention to provide a disk apparatus and a chucking method of the disk apparatus capable of reducing the disk apparatus in thickness and size.

Especially, it is another object of the invention to provide a chucking method of a disk apparatus and the disk apparatus capable of sufficiently securing such a clearance that if a traverse is obliquely lowered, it is difficult to sufficiently secure a clearance between the traverse and a lower surface of a disk when the disk is inserted.

Further, it is another object of the invention to provide a chucking method of a disk apparatus and the disk apparatus in which a disk is separated from a position limiting member without moving the position limiting member of a disk after the disk is chucked and with this, a link mechanism for retreating the position limiting member can be eliminated.

DISCLOSURE OF THE INVENTION

A first aspect of the present invention provides a chucking method of a disk apparatus comprising a chassis outer sheath including a base body and a lid, in which a front surface of the chassis outer sheath is formed with a disk inserting opening into which a disk is directly inserted, a traverse provided on the base body holds a spindle motor and a pickup, a slider mechanism is disposed on one end of the traverse, the slider mechanism includes a cam mechanism which moves one end of the traverse toward and away from the base body, and a slider cam mechanism which moves the traverse in an inserting/discharging direction of the disk, the other end of the traverse is supported on the base body by a fixing cam, and the traverse is moved by the slider cam mechanism in the inserting/discharging direction of the disk and with this, the fixing cam moves the other end of the traverse toward and away from the base body, wherein the chucking method comprises a first step for moving the traverse toward the fixing cam, thereby separating the other end of the traverse away from the base body, a second step for separating the one end of the traverse away from the base body, thereby fitting the disk to a hub of a spindle motor, the second step being carried out after the first step, and a third step for moving the one end of the traverse toward the base body, the third step being carried out after the second step.

According to this aspect, after the other end of the traverse is separated away from the base body in the first step, the one end of the traverse is moved away from the base body in the second step, thereby carrying out the chucking operation. With this, it is possible to sufficiently secure the clearance between the disk lower surface and the traverse at the time of insertion of the disk when the traverse is lowered, as compared with a case where only the one end of the traverse is separated from the base body and the chucking operation is carried out. Therefore, the chassis outer sheath can be reduced in thickness.

According to a second aspect of the invention, in the chucking method of the disk apparatus of the first aspect, the traverse is moved toward the fixing cam after the second step, thereby separating the disk away from the position limiting member.

With this aspect, after a disk is chucked, the disk is separated from the position limiting member without operating the position limiting member of the disk. Therefore, a link mechanism for retracting the position limiting member can be eliminated.

A third aspect of the invention provides a chucking method of a disk apparatus in which a traverse holds a spindle motor and a pickup, and the disk apparatus includes a cam mechanism which moves one end or the other end of the traverse in a direction perpendicular to a base body, and moves the traverse in a horizontal direction with respect to the base body, wherein the chucking method comprises a first step for moving the traverse in the horizontal direction, thereby separating the other end of the traverse away from the base body, a second step for separating the one end of the traverse away from the base body, thereby fitting the disk to a hub of a spindle motor, the second step being carried out after the first step, and a third step for moving the one end of the traverse toward the base body, the third step being carried out after the second step.

With this aspect, after the other end of the traverse is separated away from the base body in the first step, the one end of the traverse is separated away from the base body in the second step, thereby carrying out the chucking operation. With this, it is possible to sufficiently secure the clearance between the disk lower surface and the traverse at the time of insertion of the disk when the traverse is lowered, as compared with a case where only the one end of the traverse is separated from the base body and the chucking operation is carried out. Therefore, the chassis outer sheath can be reduced in thickness.

According to a fourth aspect of the invention, in the chucking method of the disk apparatus of the third aspect, the traverse is moved in the horizontal direction after the second step, thereby separating the disk away from the position limiting member.

With this aspect, after a disk is chucked, the disk is separated from the position limiting member without operating the position limiting member of the disk. Therefore, a link mechanism for retracting the position limiting member can be eliminated.

A fifth aspect of the invention provides a disk apparatus comprising a chassis outer sheath including a base body and a lid, in which a front surface of the chassis outer sheath is formed with a disk inserting opening into which a disk is directly inserted, and a traverse provided on the base body holds a spindle motor and a pickup, wherein a slider mechanism is disposed on one end of the traverse, the slider mechanism includes a cam mechanism which moves one end of the traverse toward and away from the base body, and a slider cam mechanism which moves the traverse in an inserting/discharging direction of the disk, the other end of the traverse is supported on the base body by a fixing cam, the traverse is moved by the slider cam mechanism and with this, the fixing cam moves the other end of the traverse toward and away from the base body.

According to this aspect, after the other end of the traverse is separated away from the base body, the one end of the traverse is separated away from the base body, thereby carrying out the chucking operation. With this, it is possible to sufficiently secure the clearance between the disk lower surface and the traverse at the time of insertion of the disk when the traverse is lowered, as compared with a case where only the one end of the traverse is separated from the base body and the chucking operation is carried out. Therefore, the chassis outer sheath can be reduced in thickness.

According to a sixth aspect of the invention, in the disk apparatus of the fifth aspect, the traverse is moved by the slider cam mechanism, thereby separating the disk away from a position limiting member.

With this aspect, after a disk is chucked, the disk is separated from the position limiting member without operating the position limiting member of the disk. Therefore, a link mechanism for retracting the position limiting member can be eliminated.

BEST MODE FOR CARRYING OUT THE INVENTION

A disk apparatus according to an embodiment of the present invention will be explained.

Figure 1:
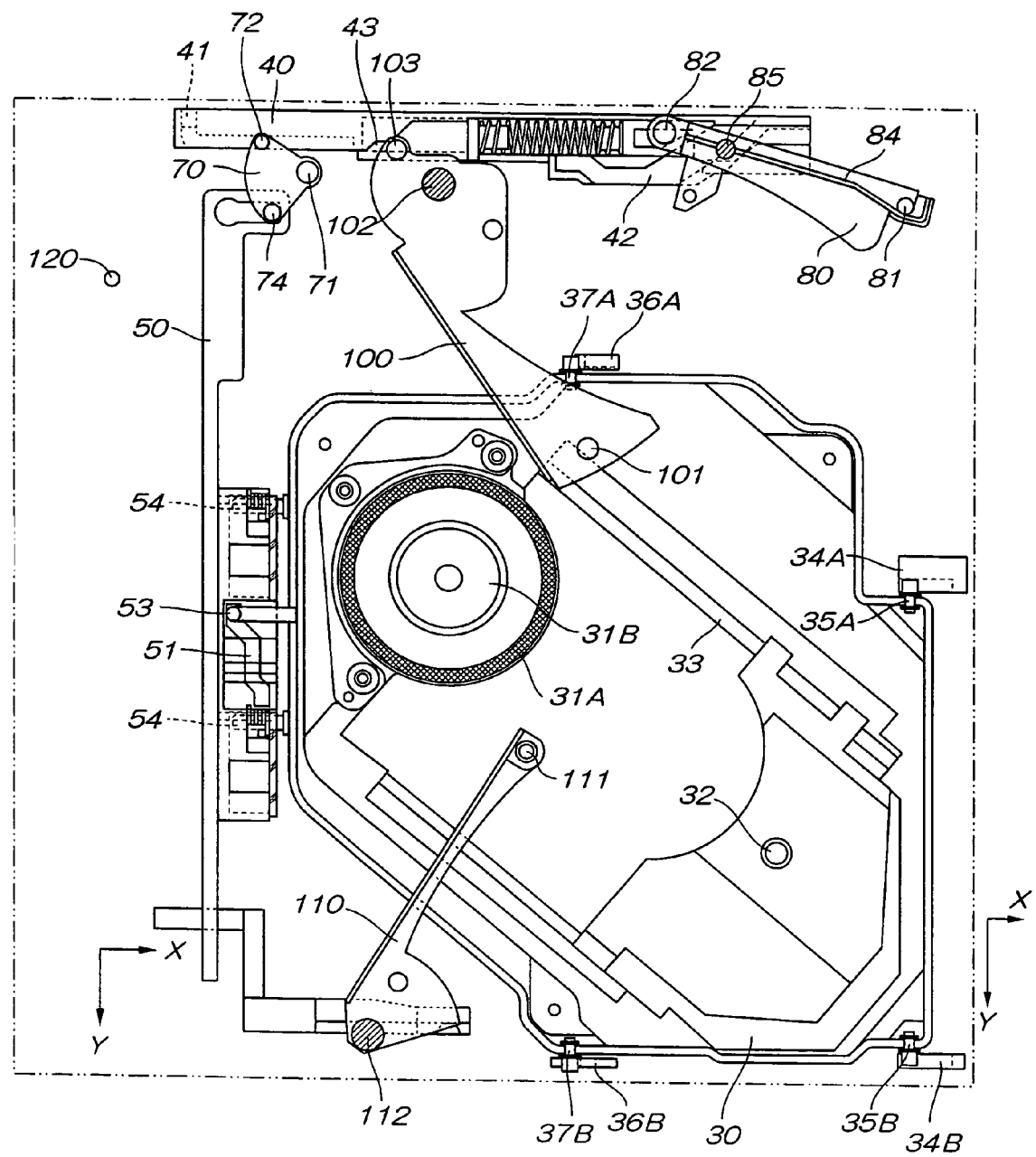
FIG. 1 is a plan view of an essential portion of a base body of the disk apparatus according to an embodiment of the present invention.
Figure 2:
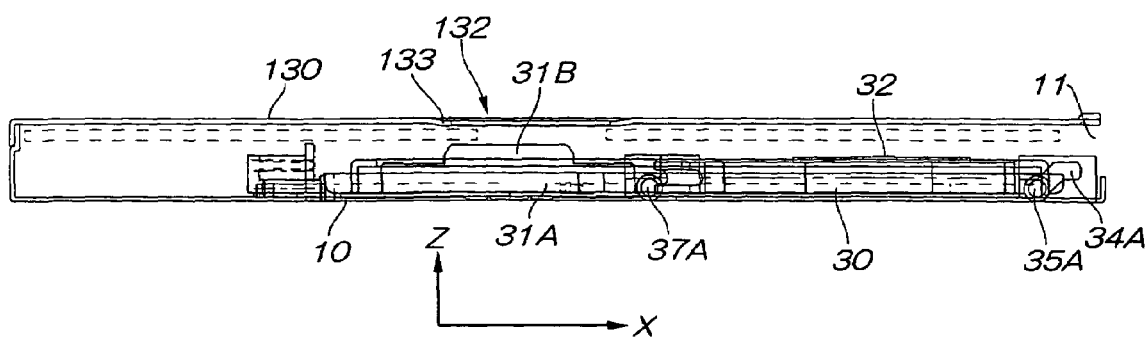
FIG. 2 is a side sectional view of an essential portion of the disk apparatus.
Figure 3:
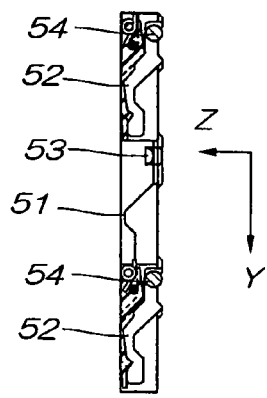
FIG. 3 is a side view of a sub-slider of the disk apparatus.

FIG. 1 is a plan view of an essential portion of a base body of the disk apparatus according to the embodiment. FIG. 2 is a side sectional view of an essential portion of the disk apparatus. FIG. 3 is a side view of a sub-slider of the disk apparatus.

The disk apparatus of this embodiment includes a chassis outer sheath comprising a base body and a lid. A bezel is mounted on a front surface of the chassis outer sheath. The disk apparatus of this embodiment is a slot-in type disk apparatus in which a disk is directly inserted from a disk inserting opening formed in the bezel.

A disk inserting opening 11 into which a disk is directly inserted is formed in a front side of a base body 10. A traverse 30 is disposed in the base body 10.

The traverse 30 holds the spindle motor 31A, a pickup 32, and drive means 33 for moving the pickup 32. A rotation shaft of the spindle motor 31A includes the hub 31B for holding a disk. The spindle motor 31A is provided on one end of the traverse 30. The pickup 32 is disposed on the other end of the traverse 30 in a standby state or a chucking state. The pickup 32 can move from one end to the other end of the traverse 30. The drive means 33 includes a drive motor, a pair of rails for allowing the pickup 32 to slide, and a gear mechanism for transmitting a driving force of the drive motor to the pickup 32. The pair of rails are disposed on the opposite sides of the pickup 32 such that the one end and the other end of the traverse 30 are in contact with each other.

In the traverse 30, the spindle motor 31A is located at a central portion of the base body 10, a reciprocating range of the pickup 32 is located closer to the disk inserting opening 11 than the spindle motor 31A, and a reciprocating direction of the pickup 32 is different from an inserting direction of the disk. Here, an angle formed between the reciprocating direction of the pickup 32 and the inserting direction of the disk is 40 to 45°.

The traverse 30 is supported on the base body 10 by a pair of fixing cams 34A and 34B. It is preferable that the pair of fixing cams 34A and 34B are disposed closer to the pickup 32 than the spindle motor 31A and are disposed closer to the disk inserting opening 11 than the standby position of the pickup 32. In this embodiment, the fixing cam 34A is provided at a central portion in the vicinity of an inside of the disk inserting opening 11, and the fixing cam 34B is provided on the one end in the vicinity of the inside of the disk inserting opening 11. The fixing cams 34A and 34B comprise grooves of predetermined lengths extending in the inserting direction of the disk. The end of one end of the groove close to the disk inserting opening 11 is separated away from the base body 10 than the other end thereof by a first Y axis distance. Cam pins 35A and 35B provided on the traverse 30 slide in the grooves of the fixing cams 34A and 34B, thereby displacing the traverse 30 in the inserting/discharging direction (X axis direction) of the disk and displacing the traverse 30 in a direction (z axis direction) in which the traverse 30 is brought close to and away from the base body 10.

A main slider 40 and a sub-slider 50 which move the traverse 30 will be explained next.

The main slider 40 and the sub-slider 50 are disposed sideway of the spindle motor 31A. The main slider 40 is disposed in such a direction that one end thereof is close to a front surface of the base body 10 and the other end of the main slider 40 is close to a rear surface of the base body 10. The sub-slider 50 is disposed in such a direction that intersects with the main slider 40 at right angles.

A cam mechanism for displacing the traverse 30 comprises a slider cam mechanism 51 and a vertically moving cam mechanism 52. The cam mechanism is provided on the sub-slider 50. The slider cam mechanism 51 comprises a groove of a predetermined length extending in a moving direction of the sub-slider 50. This groove approaches the disk inserting opening 11 (X axis direction) in stages from its one end (closer to the main slider 40) toward the other end. The traverse 30 is provided with a slide pin 53. The slide pin 53 provided on the traverse 30 slides in the groove of the slider cam mechanism 51, thereby displacing the traverse 30 in the inserting/discharging direction (X axis direction) of the disk. The vertically moving cam mechanism 52 comprises a groove of a predetermined length extending in the moving direction of the sub-slider 50. A distance (Z axis distance) between the groove and the base body 10 is varied in stages from one end thereof (closer to the main slider 40) toward the other end. The vertically moving pin 54 provided on the traverse 30 slides in the groove of the vertically moving cam mechanism 52, thereby displacing the traverse 30 in a direction (Z axis direction) in which the traverse 30 is brought close to and away from the base body 10.

A loading motor (not shown) is disposed on one end of the main slider 40. A drive shaft of the loading motor and one end of the main slider 40 are connected to each other through a gear mechanism (not shown).

The main slider 40 can slide in a longitudinal direction (X axis direction) by driving the loading motor. The main slider 40 is connected to the sub-slider 50 through a cam lever 70.

The cam lever 70 includes a turning fulcrum 71, the cam lever 70 is engaged with a cam groove 41 provided in the main slider 40, and the cam lever 70 is engaged with a cam groove provided in the sub-slider 50 through a pin 74.

The cam lever 70 moves the sub-slider 50 in association with movement of the main slider 40, operates the slider cam mechanism 51 and the vertically moving cam mechanism 52 by the movement of the sub-slider 50, and displaces the traverse 30.

The traverse 30 is further supported on the base body 10 by a pair of fixing cams 36A and 36B also. It is preferable that the pair of fixing cams 36A and 36B are disposed between the fixing cams 34A and 34B and the sub-slider 50, and are disposed at intermediate positions between the fixing cams 34A and 34B and the sub-slider 50. The fixing cams 36A and 36B comprise grooves of predetermined lengths which are the same structures as those of the fixing cams 34A and 34B. Cam pins 37A and 37B provided on the traverse 30 slide in the fixing cams 36A and 36B, thereby displacing the traverse 30 in the inserting direction of the disk, and displacing the traverse 30 in a direction in which the traverse 30 is brought close to and away from the base body 10.

The above explained traverse 30, fixing cams 34A, 34B, 36A, and 36B, main slider 40, sub-slider 50, and loading motor are provided on the base body 10, and form a disk-inserting space between a lid 130 and these members.

Next, a guide member for supporting a disk and a lever member for operating the disk will be explained.

A first disk guide (not shown) of a predetermined length is provided on one end of the base body 10 in the vicinity of the disk inserting opening 11. The first disk guide has a groove having a U-shaped cross section as viewed from a disk inserting direction. A disk is supported by this groove.

A pulling-in lever 80 is provided on the other end side of the base body 10 in the vicinity of the disk inserting opening 11. A movable side end of the pulling-in lever 80 includes a second disk guide 81. The second disk guide 81 comprises a cylindrical roller, and the second disk guide 81 is turnably provided on the movable side end of the pulling-in lever 80. A groove is formed in a roller outer periphery of the second disk guide 81, and the disk is supported by this groove.

The pulling-in lever 80 is disposed such that its movable side end is operated on the side of the disk inserting opening 11 than its fixed side end, and the fixed side end includes a turning fulcrum 82. A third disk guide 84 of a predetermined length is provided between the movable side end and the fixed side end of the pulling-in lever 80. The pulling-in lever 80 includes a pin 85. If the pin 85 slides in a cam groove 42 of the main slider 40, the pulling-in lever 80 is operated. That is, the pulling-in lever 80 is operated such that as the main slider 40 moves, the second disk guide 81 is brought close to and away from the spindle motor 31A.

The base body 10 is provided with a discharging lever 100. A guide 101 is provided on a movable side end of one end of the discharging lever 100. The discharging lever 100 is provided at its other end with a turning fulcrum 102. The discharging lever 100 is operated in association with motion of the main slider 40 by a pin 103 and a cam groove 43.

A discharging lever 110 is provided on the base body 10 on the side opposed to the discharging lever 110. A guide 111 is provided on a movable side end of one end of the discharging lever 110. A turning fulcrum 112 is provided on the other end of the discharging lever 110. The discharging lever 110 moves in the same manner as that of the discharging lever 100.

The base body 10 is provided at its rear side with a fixing pin 120. The fixing pin 120 limits a position of a disk when the disk is loaded or chucked.

As shown in FIG. 2, the chassis outer sheath comprises the base body 10 and a lid 130. The lid 130 is provided at its central portion with an opening 132. The opening 132 is a circular opening having a radius greater than a center hole of the disk. Therefore, the opening 132 is larger than the hub 31B of the spindle motor 31A which is fitted into the center hole of the disk.

The opening 132 is formed at its outer periphery with a narrowed portion 133 projecting toward the base body 10.

The entire inner peripheral surface of the lid 130 is coated with fluorine-based material in which urethane beads are mixed. Only a contact surface of the lid 130 with respect to a disk of the narrowed portion 133 may be coated with the fluorine-based material. A preferable coating material includes urethane resin having beads of 20μ diameter in which 5% fluorine and 1.0 to 1.5% silicon are mixed therein. It is preferable that the coefficient of friction of the coating material is 0.2 to 0.6, and more preferably 0.55 or less.

A motion mechanism of the traverse 30 will be explained using FIGS. 1 to 15.

Positions of the cam mechanism and the pin in FIGS. 1 to 3 show a loading completion state of the disk.

Figure 4:
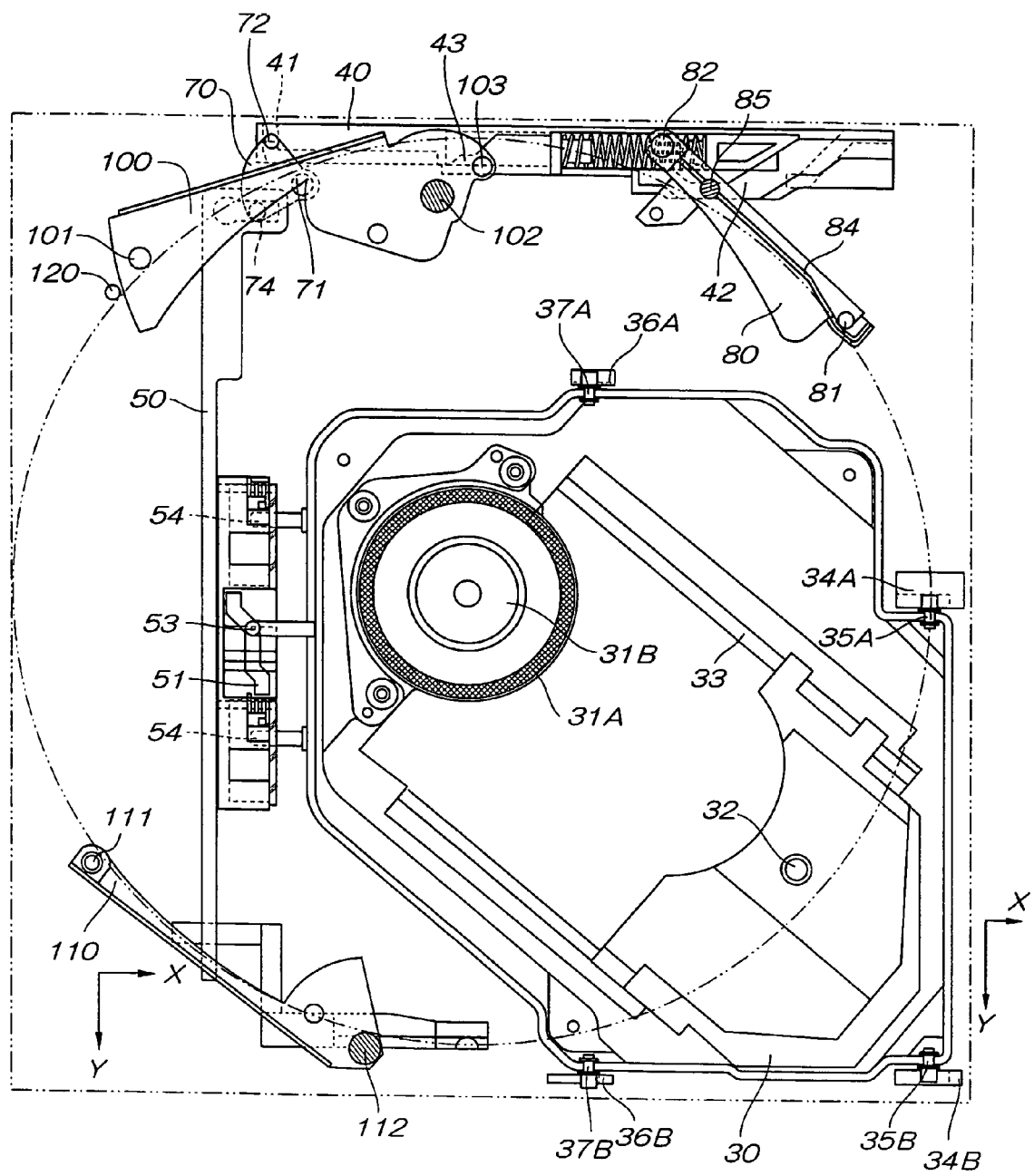
FIG. 4 is a plan view of an essential portion of the base body showing a state where a first predetermined time is elapsed after the chucking operation of a disk of the disk apparatus according to the embodiment is started.
Figure 5:
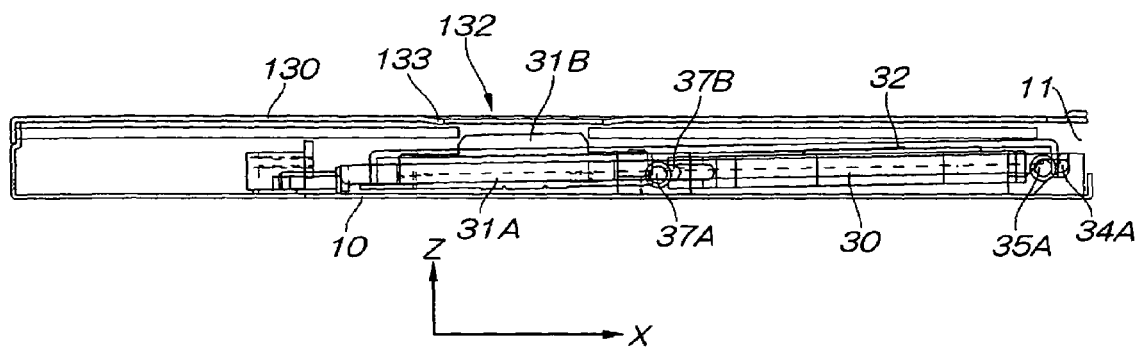
FIG. 5 is a side view of an essential portion in this state.
Figure 6:
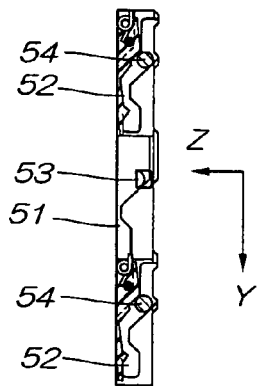
FIG. 6 is a side view of the sub-slider in this state.

FIG. 4 is a plan view of an essential portion of the base body showing a state where a first predetermined time is elapsed after the chucking operation of a disk of the disk apparatus is started. FIG. 5 is a side sectional view of an essential portion in this state. FIG. 6 is a side view of the sub-slider in this state.

Figure 7:
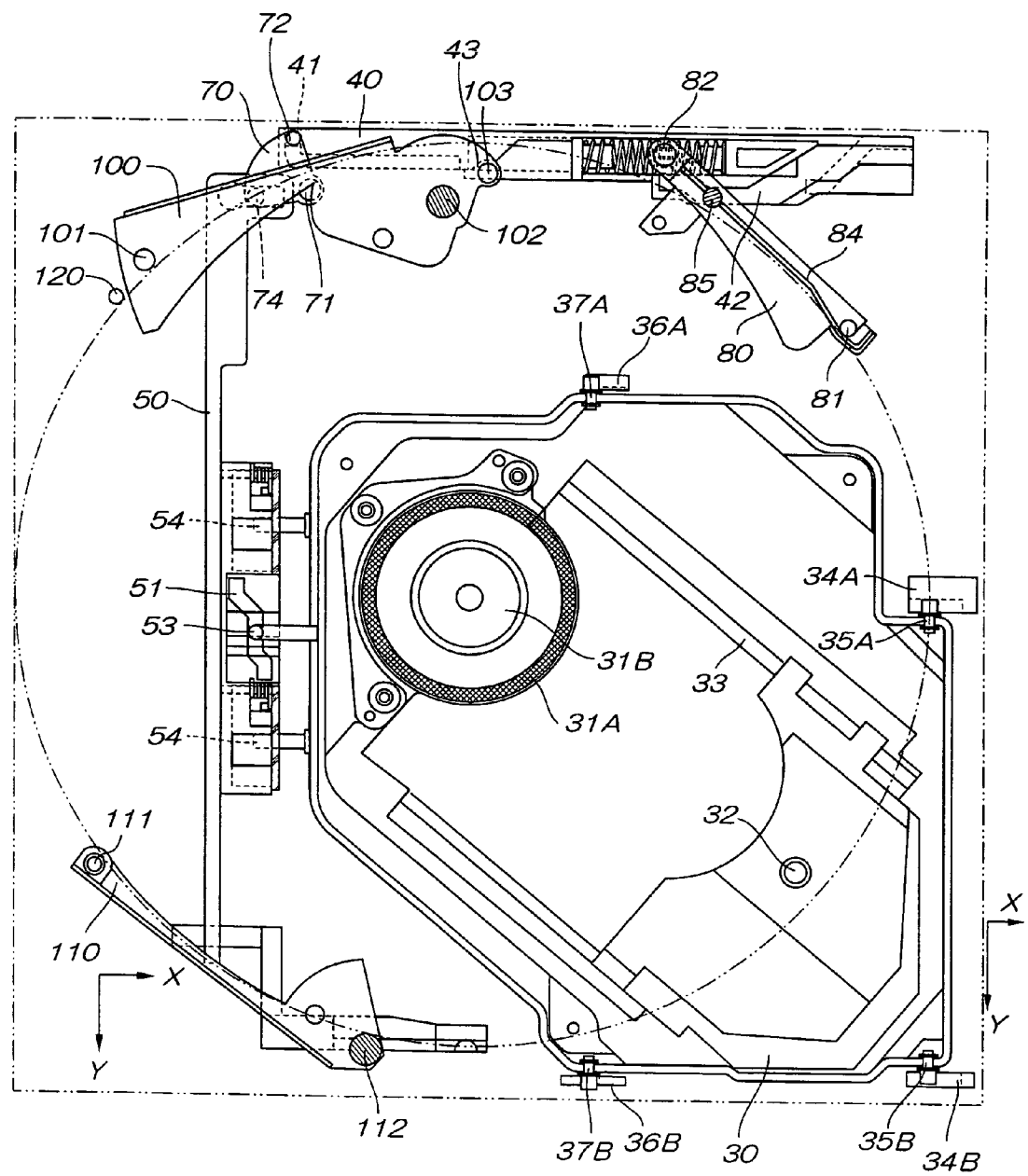
FIG. 7 is a plan view of an essential portion of the base body showing a state where a second predetermined time is elapsed from the state shown in FIG. 4.
Figure 8:
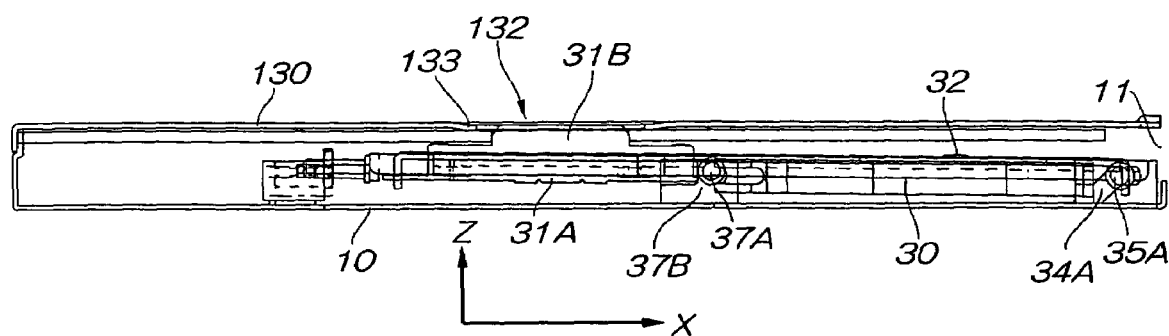
FIG. 8 is a side sectional view of an essential portion of this state.
Figure 9:
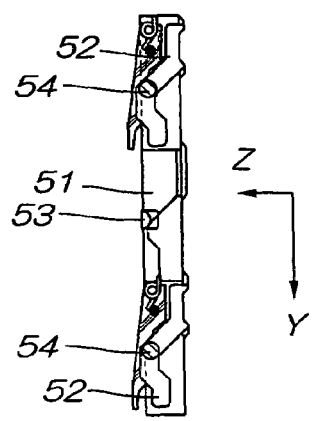
FIG. 9 is a side view of the sub-slider in this state.

FIG. 7 is a plan view of an essential portion of the base body showing a state where a second predetermined time is elapsed from the state shown in FIG. 4. FIG. 8 is a side sectional view of an essential portion of this state. FIG. 9 is a side view of the sub-slider in this state.

Figure 10:
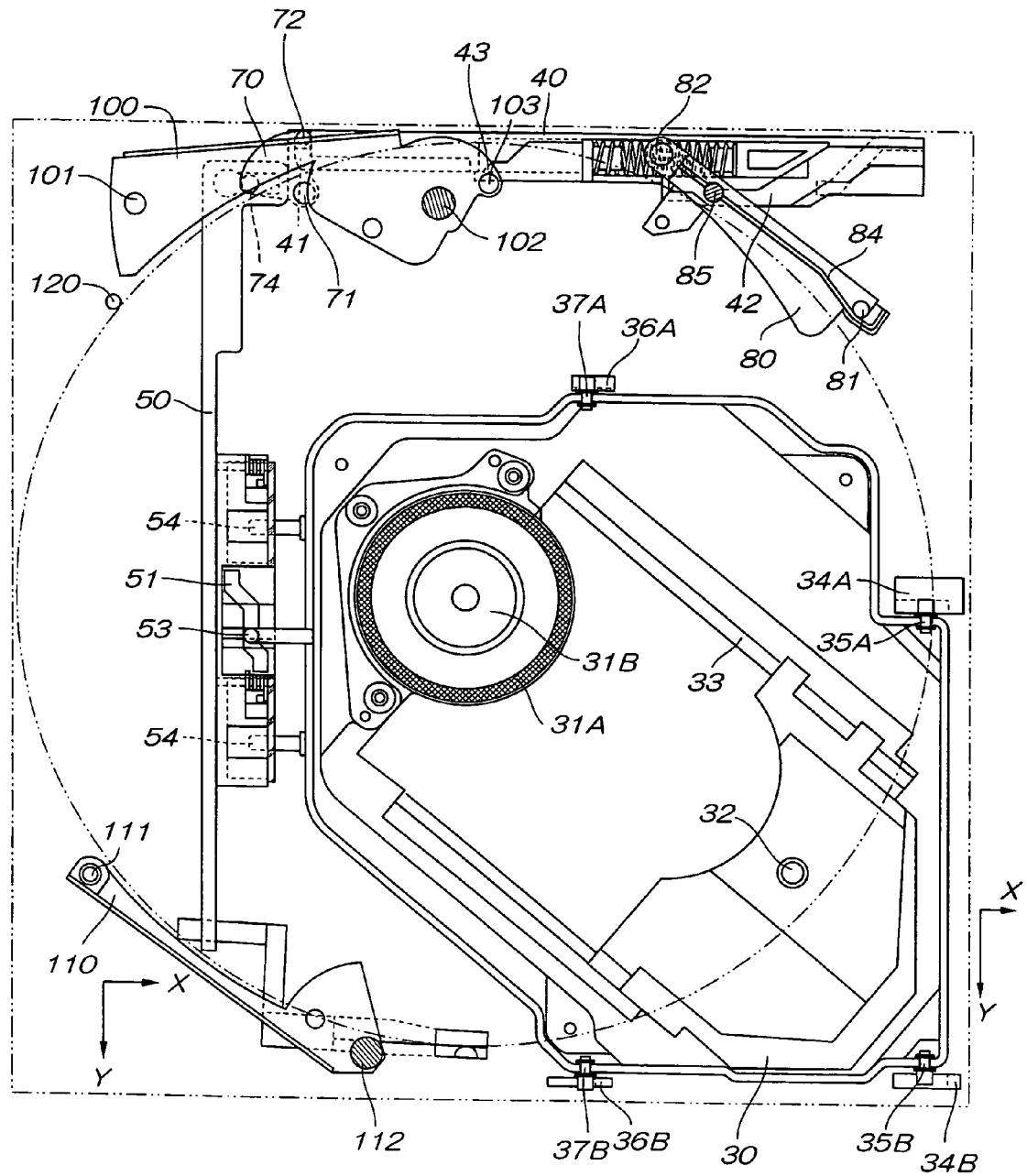
FIG. 10 is a plan view of an essential portion of the base body showing a state where a third predetermined time is elapsed from the state shown in FIG. 7 and a traverse is brought upward to its uppermost position.
Figure 11:
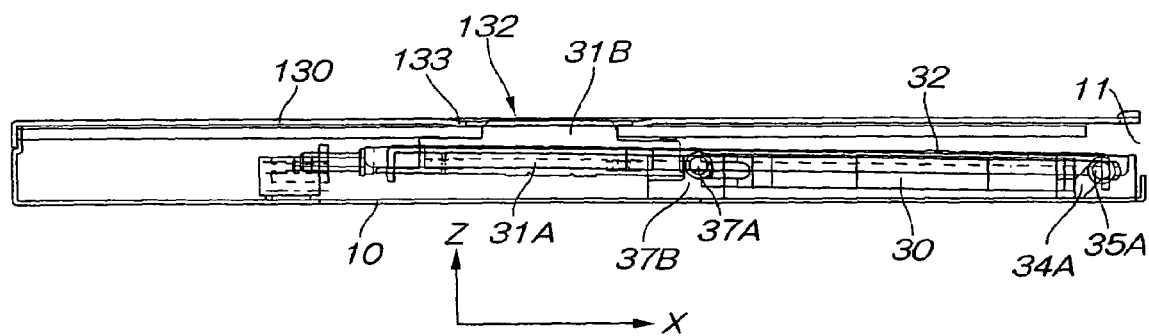
FIG. 11 is a side sectional view of an essential portion of this state.
Figure 12:
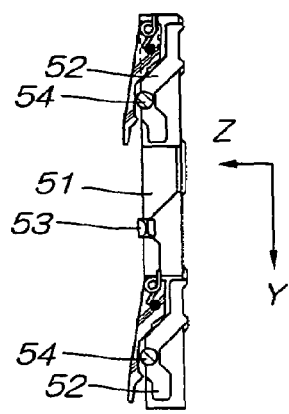
FIG. 12 is a side view of the sub-slider in this state.

FIG. 10 is a plan view of an essential portion of the base body showing a state where a third predetermined time is elapsed from the state shown in FIG. 7 and a traverse is brought upward to its uppermost position. FIG. 11 is a side sectional view of an essential portion of this state. FIG. 12 is a side view of the sub-slider in this state.

Figure 13:
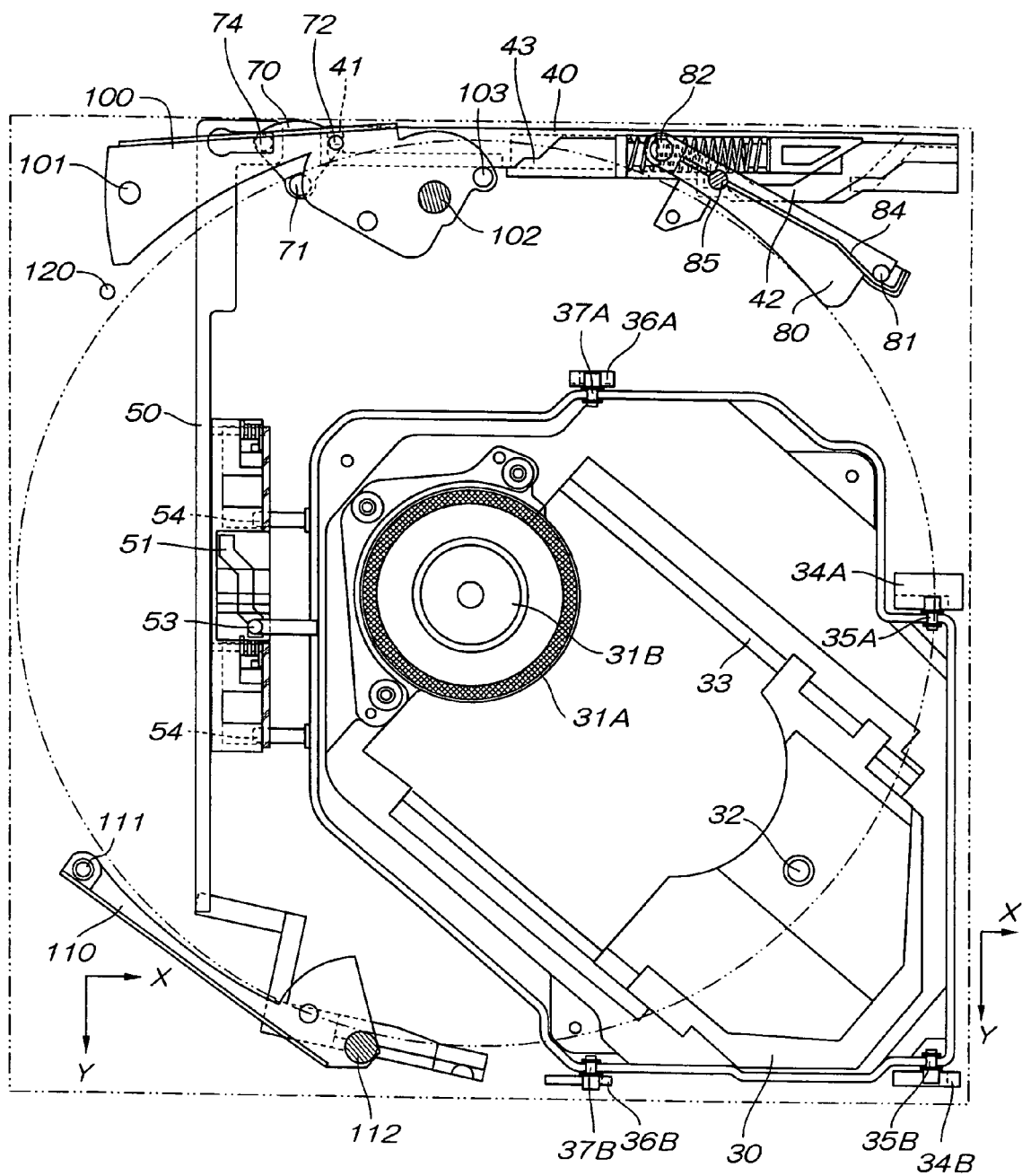
FIG. 13 is a plan view of an essential portion of the base body showing a state where a fourth predetermined time is elapsed from the state shown in FIG. 10 and a disk is recorded or replayed.
Figure 14:
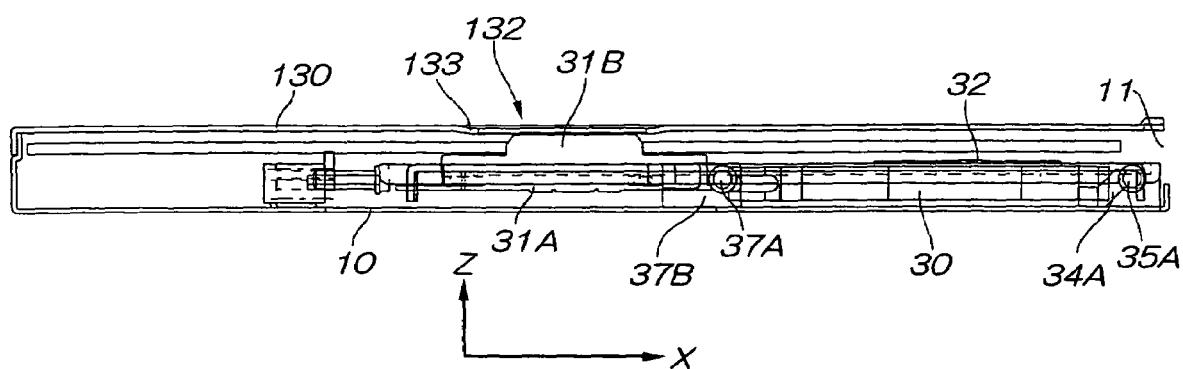
FIG. 14 is a side sectional view of an essential portion of this state.
Figure 15:
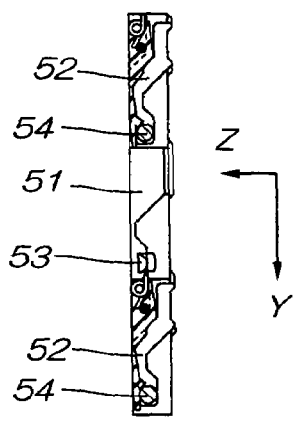
FIG. 15 is a side view of the sub-slider in this state.

FIG. 13 is a plan view of an essential portion of the base body showing a state where a fourth predetermined time is elapsed from the state shown in FIG. 10 and a disk is recorded or replayed. FIG. 14 is a side sectional view of an essential portion of this state. FIG. 15 is a side view of the sub-slider in this state.

In the loading completion state of the disk, as shown in FIGS. 1 to 3, the traverse 30 is disposed at the rearmost position closest to the base body 10.

That is, in this state, the slide pin 53 is located on one end (close to the main slider 40) of the slider cam mechanism 51. Therefore, the traverse 30 is disposed at a position close to the rearmost side. The cam pins 35A and 35B are located on the other ends of the grooves of the fixing cams 34A and 34B. Therefore, the other end (close to the pickup 32) of the traverse 30 is disposed at a position closest to the base body 10. The vertically moving pin 54 is located at one end (close to the main slider 40) of the vertically moving cam mechanism 52. Therefore, the one end (close to the spindle motor 31A) of the traverse 30 is disposed at a position closest to the base body 10.

The main slider 40 moves toward the disk inserting opening 11 from the state shown in FIG. 1, and with the movement of the main slider 40, the sub-slider 50 moves toward the main slider 40.

In a state where the chucking motion is carried out for the first predetermined time, as shown in FIGS. 4 to 6, the traverse 30 moves toward the disk inserting opening 11 by a first X axis distance, and the other end of the traverse 30 is disposed at a location away from the base body 10 by a first Z axis distance.

That is, in this state, the slide pin 53 moves the slider cam mechanism 51 by the first Y axis distance, and the traverse 30 moves toward the disk inserting opening 11 by the first X axis distance. Thus, the cam pins 35A and 35B move toward one ends of the grooves of the fixing cams 34A and 34B by the first X axis distance, and the other end (close to the pickup 32) of the traverse 30 is disposed at a location away from the base body 10 by a first Z axis distance. The vertically moving pin 54 moves from one end (close to the main slider 40) of the vertically moving cam mechanism 52 by the first Y axis distance. Since the grooves located in the range of the first Y axis distance have the same heights, the one end (close to the spindle motor 31A) of the traverse 30 is held at a position closest to the base body 10.

If the main slider 40 moves toward the disk inserting opening 11 from the state shown in FIG. 4, the sub-slider 50 further moves toward the main slider 40.

In a state where the chucking motion is further carried out for a second predetermined time from the state shown in FIG. 4, the one end of the traverse 30 is disposed at a location away from the base body 10 by a second Z axis distance (second Z axis distance>first Z axis distance) as shown in FIGS. 7 to 9.

That is, in this state, the slide pin 53 moves the slider cam mechanism 51 by the second Y axis distance, but since the groove of the slider cam mechanism 51 is provided in parallel to the moving direction (Y axis direction) of the sub-slider 50 in this moving range, the traverse 30 does not move toward the disk inserting opening 11. Therefore, the cam pins 35A and 35B do not move in the grooves of the fixing cams 34A and 34B. The vertically moving pin 54 moves in the groove of the vertically moving cam mechanism 52 by the second Y axis distance, and moves the one end (close to the spindle motor 31A) of the traverse 30 from the base body 10 by the second Z axis distance.

If the main slider 40 moves toward the disk inserting opening 11 from the state shown in FIG. 7, the sub-slider 50 further moves toward the main slider 40.

In a state where the chucking motion is further carried out for a third predetermined time from the state shown in FIG. 7, the one end of the traverse 30 is disposed at a position of a third Z axis distance which is most separated from the base body 10 as shown in FIGS. 10 to 12.

That is, in this state, the slide pin 53 moves the slider cam mechanism 51 by a third Y axis distance, but since the groove of the slider cam mechanism 51 is provided in parallel to the moving direction (Y axis direction) of the sub-slider 50 in this moving range, the traverse 30 does not move toward the disk inserting opening 11. Therefore, the cam pins 35A and 35B do not move in the grooves of the fixing cams 34A and 34B. The vertically moving pin 54 moves in the groove of the vertically moving cam mechanism 52 by the third Y axis distance, and moves the one end (close to the spindle motor 31A) of the traverse 30 from the base body 10 by the third Z axis distance (highest position). In this state, the chucking of the disk by the hub 31B is completed.

If the main slider 40 further moves toward the disk inserting opening 11 from the state shown in FIG. 10, the sub-slider 50 further moves toward the main slider 40.

As shown in FIGS. 13 to 15, the traverse 30 moves toward the disk inserting opening 11, the one end of the traverse 30 moves in a direction approaching the base body 10, and is disposed at a position of the first Z axis distance.

That is, in this state, the slide pin 53 moves the slider cam mechanism 51 by a fourth Y axis direction, and the traverse 30 moves toward the disk inserting opening 11 by the second Z axis distance. Therefore, the cam pins 35A and 35B move toward the one ends of the grooves of the fixing cams 34A and 34B by the second X axis distance, but the height of the other end (close to the pickup 32) of the traverse 30 is not varied. The vertically moving pin 54 moves in the groove of the vertically moving cam mechanism 52 by the fourth Y axis direction, moves the one end (close to the spindle motor 31A) of the traverse 30 toward the base body 10, and disposes the one end at a location of the first Z axis distance.

Through the above-described motion, the disk is separated from the lid 130 and also from the fixing pin 120, and the disk is brought into a replay/recording state.

The loaded disk is discharged by driving the loading motor and moving the main slider 40 toward its other end, and basically the above-described motion is carried out reversely.

According to the present invention, it is possible to reduce a disk apparatus in thickness and size.

Especially, according to the invention, it is possible to sufficiently secure a clearance between a traverse and a lower surface of a disk when the disk is inserted.

Further, according to the invention, after a disk is chucked, the disk is separated from a position limiting member without operating a position limiting member of the disk. With this, a link mechanism for retracting the position limiting member can be eliminated.

INDUSTRIAL APPLICABILITY

The disk apparatus of the present invention is useful for a disk apparatus which is incorporated or integrally set in a so-called notebook personal computer integrally provided with display means, input means, calculating means and the like.

What is claimed is:

1. A disk apparatus comprising a chassis outer sheath including a base body and a lid, in which
    a front surface of said chassis outer sheath is formed with a disk inserting opening into which a disk is directly inserted, and a traverse provided on said base body which holds a spindle motor and a pickup, wherein
    a slider mechanism is disposed on one end of said traverse parallel to said disk inserting opening,
    said slider mechanism includes a vertically moving cam mechanism which moves one end of said traverse toward and away from said base body, and a slider cam mechanism which moves said traverse in inserting/discharging directions of said disk,
    the other end of said traverse is supported on said base body by a fixing cam,
    said traverse is moved by said slider cam mechanism and said fixing cam moves the other end of said traverse toward and away from said base body.

2. The disk apparatus according to claim 1, wherein said traverse is moved by said slider cam mechanism, thereby separating said disk away from a position limiting member.

* * * * *